United States Patent [19]

Hunter et al.

[11] 3,967,862
[45] July 6, 1976

[54] ANTI-SKID CONTROL SYSTEM EMPLOYING INTEGRAL-PLUS-PROPORTIONAL CONTROL OF PULSED MODULATION

[75] Inventors: Gordon E. Hunter; James E. Rau, both of Anaheim; Rogell Van Wyk, Brea, all of Calif.

[73] Assignee: Rockwell International Corporation, El Segundo, Calif.

[22] Filed: Mar. 17, 1975

[21] Appl. No.: 559,100

[52] U.S. Cl. .............................. 303/21 P; 180/82 R; 303/20; 246/182 B; 318/609
[51] Int. Cl.² ................................................ B60T 8/02
[58] Field of Search ................... 180/82 R; 188/181; 235/150.2; 303/20, 21; 317/5; 318/609; 340/53, 62; 246/182 R, 182 B

[56] References Cited
UNITED STATES PATENTS

| | | |
|---|---|---|
| 3,131,975 | 5/1964 | Smith et al. ....................... 303/21 P |
| 3,362,757 | 1/1968 | Marcheron ........................ 303/21 P |
| 3,508,795 | 4/1970 | Scharlack et al. ................. 303/21 P |
| 3,584,921 | 6/1971 | Crawford .......................... 303/21 BE |
| 3,614,173 | 10/1971 | Branson ............................ 303/21 P |
| 3,791,701 | 12/1974 | Riordan ............................ 303/21 BE |

*Primary Examiner*—Stephen G. Kunin
*Attorney, Agent, or Firm*—H. Fredrick Hamann; Rolf M. Pitts

[57] ABSTRACT

In an anti-skid type control system for automotive vehicles, apparatus for maintaining wheel slip in a region of values associated with a maximum coefficient of road friction. Periodic modulation of the wheel brake torque in conjunction with wheel acceleration measurement are employed to determine the variation of the coefficient of road friction from an optimum value, while integral-plus-proportional control of the pulse modulation allows compensatory variation of the wheel torque and slip condition to a condition providing the optimum coefficient of road friction.

14 Claims, 13 Drawing Figures

ANTI-SKID CONTROL SYSTEM EMPLOYING INTEGRAL-PLUS-PROPORTIONAL CONTROL OF PULSED MODULATION

COPENDING APPLICATIONS

1. U.S. application Ser. No. 514,974 filed Oct. 15, 1974 by James E. Rau, et al, for Anti-Skid Control System now U.S. Pat. No. 3,930,688.

BACKGROUND OF THE INVENTION

A large body of art exists in the art of anti-skid control systems for the braking of braked vehicles. In general, such devices are intended to avoid or prevent wheel-lock in the driver's operation of a wheel braking system, while both improving lateral stability and reducing the braking distance within which the vehicle is stopped. In other words, the effects of overcontrol (due to the operator's performance limitations) are avoided without increasing the stopping distance. A review of representative prior art is included in U.S. Pat. No. 3,790,227 issued to L. C. Dozier for Brake Control System. Further related art is also disclosed in copending application Ser. No. 514,974 filed Oct. 15, 1974 (now U.S. Pat. No. 3,930,688) and assigned to Rockwell International Corporation, assignee of the subject application.

In general, such prior art is directed to the prevention of jack-knifing (due to loss of lateral stability) in tractor-trailer combinations, as well as in minimizing the stopping distances therefor, and are thus intended to cooperate with the air brake type systems normally employed on such vehicles. Such air brake type systems demonstrate a slower dynamic response than the hydraulic systems employed on smaller conventional passenger type automobiles, due to the increased compressibility of the gaseous fluid employed over that in a hydraulic system. Therefore, prior art anti-skid control systems may involve a single control mode representing compromise of the control requirements for a limited combination of vehicle type, vehicle loading and road condition; or may employ several control modes alternatively and include means for switching between such modes as the vehicle response (i.e., combinations of wheel speed and acceleration values) manifests changes in vehicle condition or road condition. In such latter, self-adaptive type of system, the longer vehicle response time, relative to the shorter times for electronic device switching and computing, permits the use of fairly sophisticated electronic control programming, while the investment and cost of the tractor-trailer and associated cargo warrants the cost of such control sophistication.

That skidding associated with overbraking and which is sought to be avoided by anti-skid brake control systems is caused by the road torque applied to the tire being less than the braking torque applied to the wheel. Similarly, high engine torque-to-vehicle weight ratio vehicles (such as police cars and high performance sport cars) may frequently skid or lose traction when high accelerations are called for by the operator, resulting in swerving, fishtailing and potential loss of vehicle control. Thus, it has been discovered that such high-acceleration control problem is analogous to that of anti-skid braking, in that more road torque is called for than the road-tire combination can provide. Because of this analogy between the acceleration-skid problem and the braking-skid problem, an anti-skid computer may also be adapted to control of an automotive engine, say in conjunction with an electronic ignition control system, to prevent loss of vehicle control while allowing a maximum utilizable acceleration under the specific road-tire conditions actually encountered.

SUMMARY OF THE INVENTION

By means of the concept of the subject invention, there is provided high speed computational means for anti-skid control of an automotive vehicle and which does not require brake pressure monitoring nor multiple control modes, nor mode control switching based on brake pressure monitoring nor monitoring of preselected rates or combinations of conditions of velocity and acceleration.

In a preferred embodiment of the invention, there is provided apparatus for maintaining wheel slip of the vehicle in a region of values associated with a maximum coefficient of road friction. Periodic modulation of the wheel torque is employed in conjunction with wheel acceleration measurement to determine the sense of the variation of the coefficient of road friction $\mu$ from an optimum value as a function of wheel slip, $s$, while integral-plus-proportional control of the pulse modulation allows compensatory variation of the wheel torque and slip condition to a condition providing the optimum coefficient of friction. In other words, the sense of the slope $K\mu = d\mu/ds$ of the $\mu$ versus slip curve is determined and, in a braking application, a positive slope measurement causes increased brake pressure and a negative or zero slope measurement results in a reduction in brake pressure. Such variation in $K\mu = d\mu/ds$, the slope of the coefficient of friction versus slip, may be detected by comparing the time-averaged wheel acceleration over a torque modulation interval or duty cycle with the time-averaged acceleration over the modulation cycle, for example.

Accordingly, it is an object of the invention to provide an improved anti-skid control system employing only wheel acceleration input data.

It is also an object of the invention to provide an anti-skid control system useful in the prevention of vehicle skidding under high-performance vehicle acceleration conditions as well as under vehicle braking conditions.

It is a further object to provide integral-plus-proportional control of pulse modulation of an anti-skid control system.

These and further objects of the invention will become apparent from the following description, taken together with the accompanying drawings in which:

BRIEF DESCRIPTION OF THE DRAWINGS

In the figures, like reference characters refer to like parts.

DESCRIPTION OF THE PREFERRED EMBODIMENTS

The fundamental parameter which permits control of an automobile, or other self-propelled wheeled vehicle, is the force of friction which exists between the road surface and the vehicle's wheels. This force permits the vehicle operator to accelerate, decelerate, and steer the vehicle. The phenomenon of skidding occurs when a maneuver commanded by the vehicle operator requires more frictional force than the road-tire surface can supply. Depending on the maneuver commanded, the operator may find that he has lost control of the vehicle when skidding occurs, and the vehicle moves in a path determined by its angular and translational momentum and the road-tire forces.

Stopping capability in an automotive braking system is fundamentally determined by the character of the road-tire surface, and this character is more frequently described by the coefficient of friction, $\mu$, where $\mu$ is defined as the ratio of the frictional force which resists the motion between two surfaces to the normal force between them (i.e., the force perpendicular to the desired motion). With rolling surfaces $\mu$ is also a function of the parameter slip, $s$, defined by the expression:

$$s = \frac{V_R - V_W}{V_R} = 1 - \frac{V_W}{V_R} \quad (1)$$

where:

$V_W$ = Braked wheel velocity
$V_R$ = Vehicle, or unbraked wheel, velocity.

Figure 4:
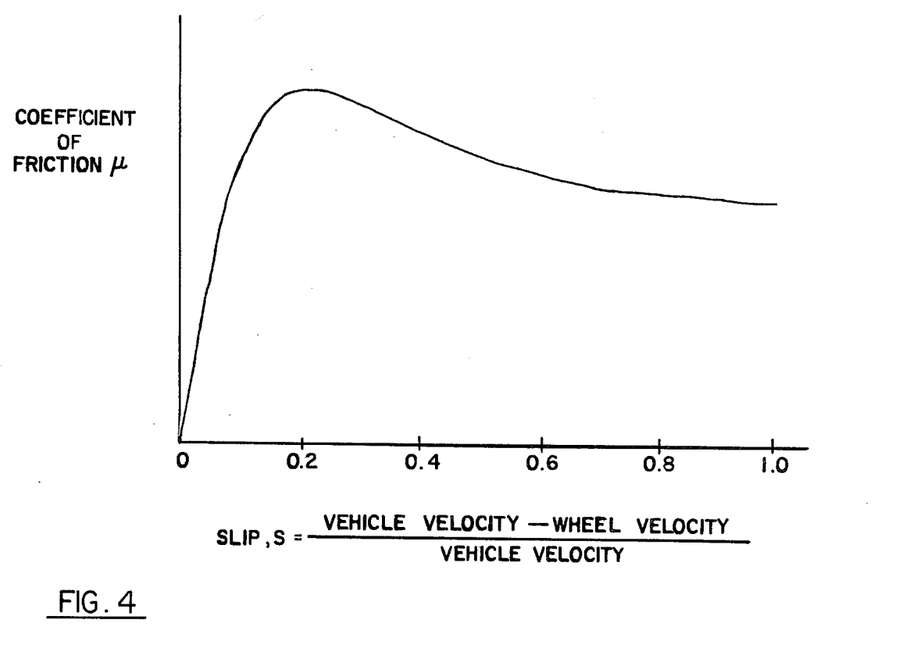
FIG. 4 is an exemplary curve of the coefficient of friction versus wheel slip for a vehicle in which the inventive system may be advantageously employed.

Extensive studies of the nature of the variation of $\mu$ with slip made over a wide variety of road surfaces, tires, and road conditions in general show that the representative shape of the $\mu$-slip curve for almost all surfaces is somewhat similar to that shown in FIG. 4. The significant aspect of this curve is that a maximum value of $\mu$ occurs. The specific shape of the curve is unimportant since it may vary widely with conditions, including velocity. The occurrence of the maximum value means that an anti-skid braking system should preferably be operated such that braking occurs at this peak if minimum stopping distance (maximum stopping efficiency) is to be achieved.

Lateral stability is inherently related to the stopping problem. The best that can be done to preserve lateral stability is to "keep the wheels rolling" (i.e., avoid lock-up). It is appreciated that if the system can seek and hold the peak of the $\mu$-slip curve, the wheels will continue to rotate. Note that loss of lateral stability is not to be confused with pulling the vehicle in transverse direction as a result of unbalanced road-tire forces. However, steerability, similarly as lateral stability, requires that the wheels keep rolling.

Severe buffeting of the vehicle and/or its suspension and steering system is caused by the sudden application of large forces or by periodic application of smaller forces at a periodic rate near the resonance of some oscillatory mode of the vehicle's suspension system. If the system is adapted to detecting small deviations from optimum operating conditions and to compensate by means of only small force variations, then the probability of exciting resonant modes is minimized.

From the foregoing it is to be appreciated a key factor in achieving the desired performance properties in an automated, anti-skid braking system is very short response time of the control system. This implies, not only short computer solution times, but a high speed, hydraulic-powered actuating system capable of operating at 10 hertz, or better. The slow, vacuum (or air) powered systems have response frequencies of the order of 2-3 hertz and are simply incapable of providing corrective of the order to hold the $\mu$-slip peak closely; thus, their corrections must of necessity be larger, and the risk of exciting unwanted oscillations is increased.

Figure 1:
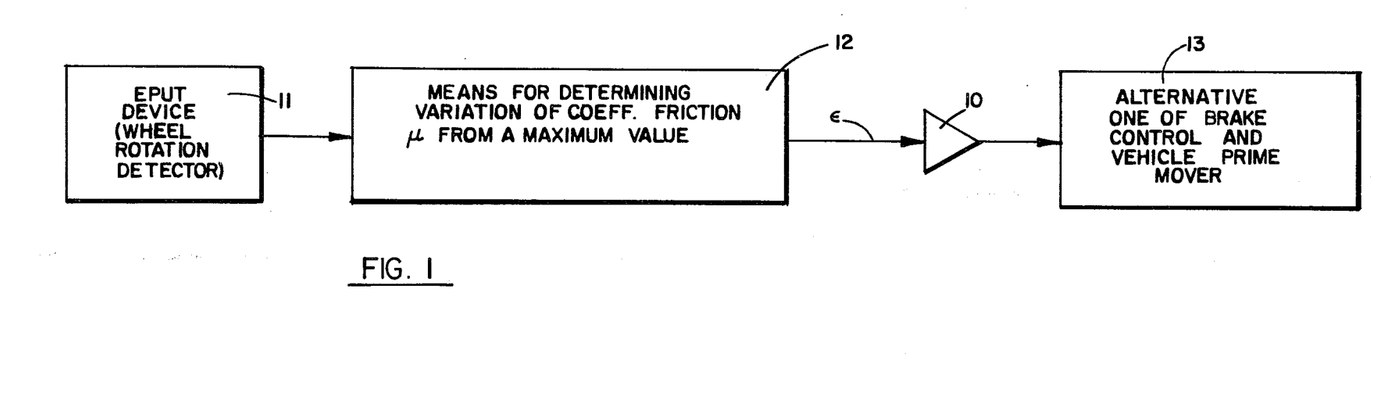
FIG. 1 is a functional block diagram of a system embodying the concept of the invention.

Referring now to FIG. 1, there is illustrated an anti-skid system embodying the concept of the invention. There is provided means 10 for controlling an alternative one of a brake control system and vehicle prime mover, whereby the wheel acceleration of an associated wheeled vehicle may be controlled. In all references in this specification, the term wheel acceleration shall be understood to include deceleration or negative values of acceleration which tend to reduce wheel speed, as well as positive values of wheel acceleration which tend to increase wheel speed.

Also employed in the arrangement of FIG. 1 is an EPUT (events per unit time) device 11 in cooperation with a wheel sensor for digitally determining the velocity of a vehicle wheel subjected to control. Such EPUT devices and wheel sensors are known in the art as indicated by the illustrated cooperation of element 35 in FIG. 3 of U.S. Pat. No. 3,805,089 to Rau et al for Acceleration Measurement Device. There is further provided means 12 responsive to EPUT means 11 for determining the variation of the coefficient of road friction, $\mu$, of a utilizing vehicle from a maximum value, $\mu_{max}$.

Control means 10 is responsively coupled to the output of element 11 for compensatorily changing the applied torque on a vehicle wheel under control, for controlling the slip thereof such as to improve the value of $\mu$, the associated road coefficient of friction. Thus, in normal operation of the above-described arrangement closed loop or negative feedback cooperation is effected to maximize the parameter, $\mu$.

Controller 10 may include a proportional type electrohydraulic valve having a modulation control input applied from a periodic on-off type modulation source, whereby the resultant brake torque applied to a braked wheel may be perturbed in a ramp function fashion or alternately increased and decreased about a reference torque or operating condition.

Such perturbation results in the wheel slip, $s$, oscillating about the average wheel slip associated with the reference brake torque. Associated with such perturbation, $\Delta s$, in the nominal wheel slip is an associated change or perturbation in the coefficient of road friction, $\Delta \mu$. As may be appreciated from FIG. 4, the ratio $\Delta \mu / \Delta s = K_\mu$ is the slope of the curve $\mu$ vs. $s$, a positive slope ($\text{sgn}/K_\mu = (+)$) occurring for values of slip below that associated with the maximum value of $\mu$, a negative slope ($\text{sgn}/K_\mu = (-)$) for values of slip above that associated with the maximum value of $\mu$, and a zero slope ($K_\mu = 0$) being associated with the maximum value of $\mu$. Thus, by merely determining the sense of $K_\mu$ and continuously adjusting the wheel slip, $s$, in the direction of the point of maxima (or zero slope), the most efficient stopping or acceleration control may be effected.

Recalling certain basic relationships, it is to be appreciated that the $\mu$ versus slip curve of FIG. 4 is a mirror image of a curve of $\mu$ versus normalized vehicle velocity, $V_v$. Also, road torque $T_R$ is proportional to the product of $\mu$ and vehicle load, as to be a function of slip ($s$), vehicle weight and wheel radius. Therefore, a curve of road torque $T_R$ versus vehicle velocity is also a mirror image of FIG. 4. Brake torque, $T_B$, is proportional to brake pressure.

Now, in a braking situation, wheel acceleration $\alpha_w$ is proportional to and arises due to a net torque or difference, $\Delta T$ between the brake torque $T_B$ and road torque $T_R$.

In a nominal braking situation, an average applied brake pressure provides an average brake torque $T_{B_0}$ which establishes a nominal operating slip ($s$) at which the average road torque $T_{R_0}$ approximately balance ($T_{R_0} - T_{B_0} \approx 0$). If a periodic ramp-type modulation ($\Delta T_B$) of the brake pressure is applied to such average brake pressure, the wheel slip ($s$) is caused to oscillate about the nominal slip value as the perturbed wheel seeks a new balance between road torque ($T_R = T_{R_0} + \Delta T_R$) and brake torque ($T_B = T_{B_0} + \Delta T_B$).

If, due to the slip condition and larger total vehicle load to wheel inertia, the vehicle acceleration is small with respect to the wheel acceleration, it can be demonstrated that the rate of change of wheel acceleration $d\alpha_w/dt$ tends to be somewhat proportional to the slope, $K_\mu$, of the $\mu$ versus slip curve (of FIG. 4).

Accordingly, it has been discovered that such slope, $K_\mu$, may be determined by linearly dithering, or periodically perturbing in a ramp function, the brake pressure and measuring the resultant changes in wheel acceleration.

Figure 2:
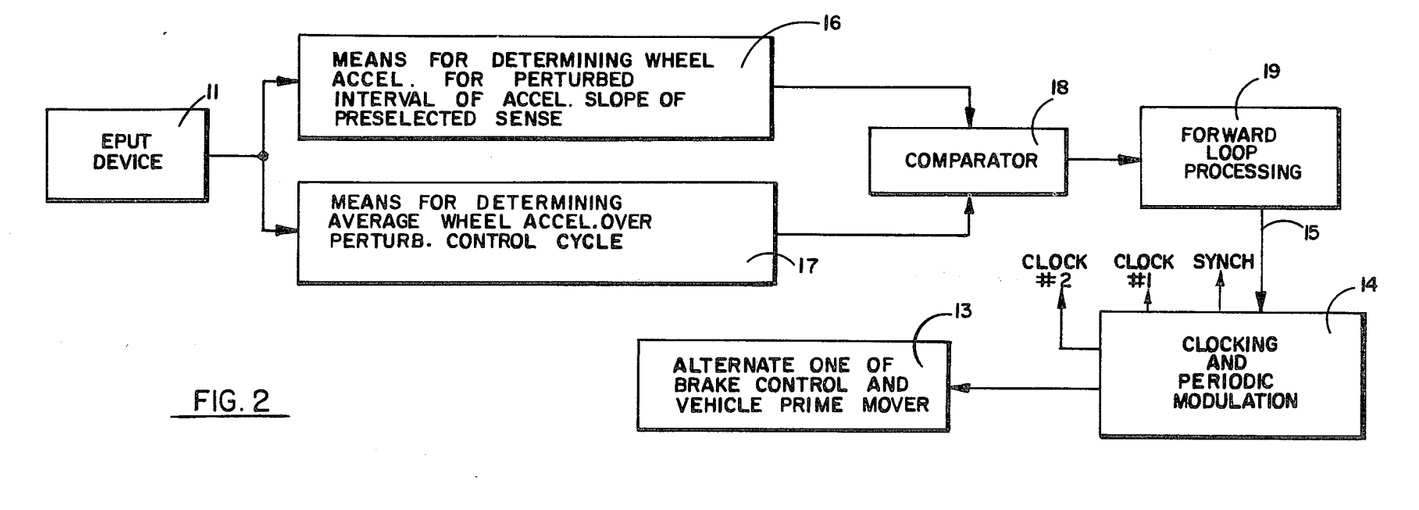
FIG. 2 is a block diagram showing the system of FIG. 1 in fuller detail.

One means of determining the sense of $K_\mu$ is shown more particularly in the detailed arrangement of FIG. 2 in which the sense of the difference is determined between the two time-averaged acceleration measurements, $A_1$ (averaged over, say, the interval of the perturbed brake pressure increase and $A_3$ averaged, say, over the perturbation periodicity of the brake pressure increase and decrease.

Referring now to FIG. 2, there is further illustrated in block diagram form means for implementing the functional arrangement of FIG. 1. There is provided clocked time-modulation means 14 having a control input 15 for providing periodic ramp modulation of element 13. Periodic modulation source 14 may be of a pulse width modulation type, in which the duty cycle or ratio of on-time pulse duration to on-time plus off-time is varied and the pulse cycle or periodicity is fixed. Alternatively, such time-modulator may employ either a fixed on-time pulse duration or fixed off-time and a variable periodicity.

Such modulation means 14 may also include a proportional type controller such as an electrohydraulic control valve for converting such time-modulation or pulse width modulation into a ramped analog output for controlled perturbation of a fluid braking system about a nominal control operating point or nominal operating condition.

There is also provided in FIG. 2 first and second means 16 and 17 responsive to EPUT device 11 for determining the time-averaged wheel acceleration over a respective one of mutual exclusive time intervals of the perturbation control cycle generated by element 14. Because of the time-controlled operation thereof, elements 16 and 17 are further responsive to clock signals from element 14 for appropriately gating such operation, as is well understood in the art. For example, element 16 may be gated to respond to wheel motion during an interval of a perturbation decrease in brake pressure (corresponding to a positive slope $dA_w/dt$ of wheel acceleration $A_w$) and element 17 may be gated to be responsive to wheel motion over either the remainder of or the entire period of the modulation control cycle or periodicity provided by element 14.

A comparator 18 responsive to the two acceleration measurements provides an output indicative of the difference therebetween. Buffer storage may be employed between the inputs to element 18 and the outputs of elements 16 and 17 in order to allow a comparison of such outputs as is well understood in the art. The output of comparator 18 is coupled to a time-modulation control input of modulator 14 by means of integral-plus-proportional signalling means 19. In other words, element 19 provides a time-modulation control input to element 14 indicative of the output of element 18 and the time integral of such output as shown more particularly in FIG. 6.

Figure 6:
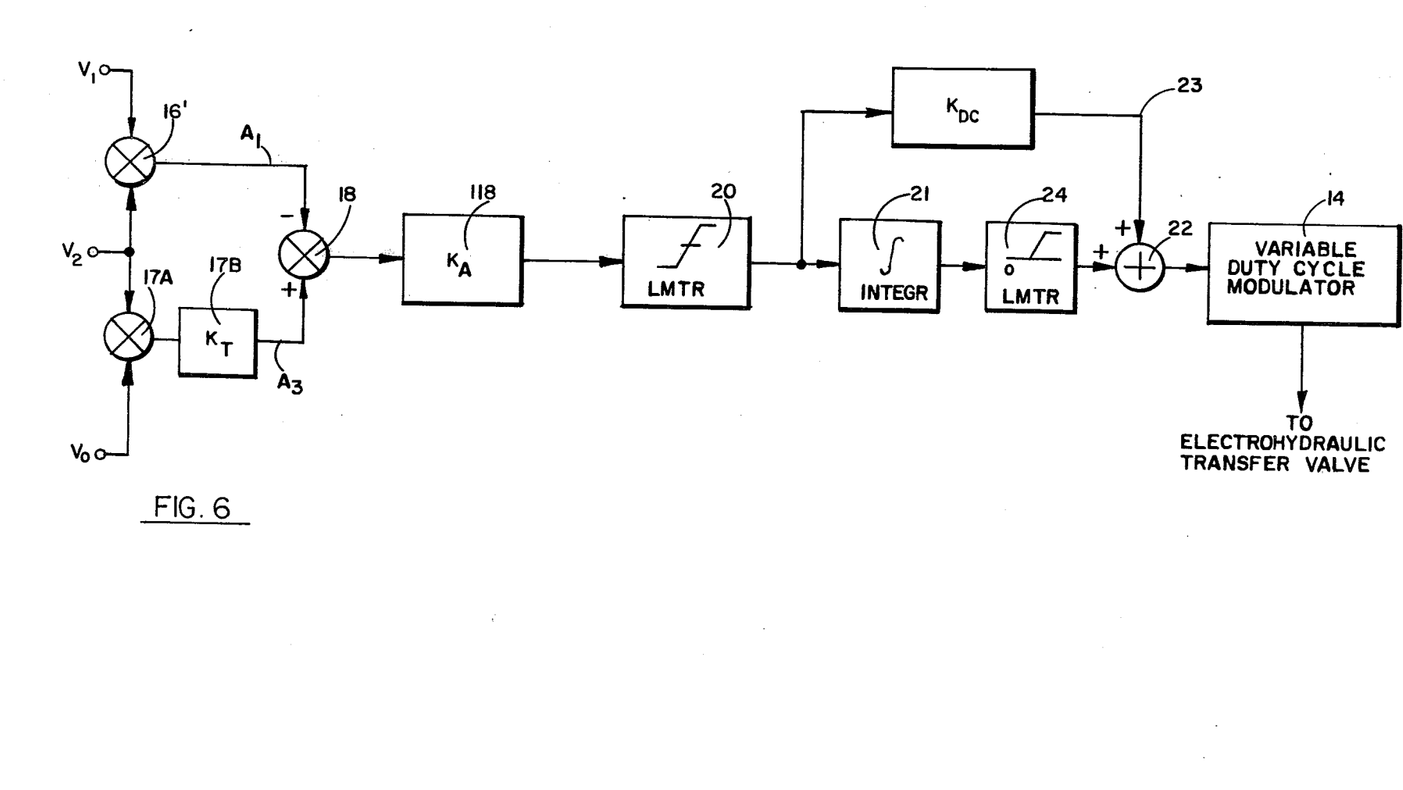
FIG. 6 is a block diagram showing more fully the functional organization and arrangement of the novel aspects of the system disclosed in FIGS. 1 and 2.

Referring to FIG. 6, there is shown the device of FIG. 2, in fuller detail, in which the output of modulator 14 periodically perturbs, say, an electrohydraulic transfer valve in a braking system (not shown) by a pressure decrease signal initiated at a cyclical time $t_0$ and enduring for the interval $t_0$ to $t_1$, and then removal of the pressure dump signal during $t_1$ to $t_2$ (corresponding to a pressure ramp increase interval), the remainder of the periodic modulation interval $t_0$ to $t_2$. The wheel velocity measured by EPUT device 11 (of FIG. 2) for each of the pressure switching times $t_0$, $t_1$ and $t_2$ is gated into associated buffer storage means as associated velocity values $V_0$, $V_1$ and $V_2$. Thus, the average wheel acceleration $A_3$ over the periodic modulation interval, $t_0$ to $t_2$, may be determined by the differential expression:

$$A_3 \approx \frac{V_2 - V_0}{t_2 - t_0} = \frac{\Delta V_{20}}{\Delta t_{20}} \qquad (2)$$

and the average acceleration $A_1$ during a brake pressure ramp increase interval ($t_1$ to $t_2$) may be determined by the expression:

$$A_1 \approx \frac{V_2 - V_1}{t_2 - t_1} = \frac{\Delta V_{21}}{\Delta V_{21}} \qquad (3)$$

Where a fixed interval is used for the periodic modulation interval, a fixed scaling or gain constant may be substituted for $1/\Delta t_{20}$ in Equation (2).

However, in a preferred embodiment, a fixed interval may be used for the pressure increase ramp ($t_1$ to $t_2$) portion of the modulation interval, whereby a fixed scaling or gain constant may be substituted for $1/\Delta t_{21}$ in mechanization of Equation (2) for determining $A_1$, and the pressure dump interval ($t_0$ to $t_1$) is varied. Thus, the modulation interval ($t_0$ to $t_2$) is similarly varied and a variable gain term employed for $1/\Delta t_{20}$ in mechanization of Equation (3) for $A_3$. For example, in FIG. 6 a comparator 16' is provided for comparing $V_1$ and $V_2$, occurring at the beginning and end, $t_1$ and $t_2$, respectively, of the ramp increase portion of a pressure modulation cycle (provided by element 14). Such comparison ($\Delta V_{21} = V_2 - V_1$) may be gain scaled by the fixed factor $K_A = 1/\Delta t_{21}$, which factor may be conveniently included in the scaling of comparator 16', itself. Alternatively, such fixed gain-scaling may be provided by a separate gain element 118, as is well understood in the art. A second comparator 17' is provided for comparing $V_o$ and $V_2$, occurring at the beginning and end, $t_1$ and $t_2$, respectively, of the pressure modulation cycle. Variable gain scaling of the resultant comparison, $\Delta V_{20}$ is required in order to obtain a proper indication of the average acceleration $A_3$, because of the variable nature of the period $\Delta t_{20} = t_2 - t_0$, over which such comparison is made. Accordingly, the gain term $K_T$ is made to vary inversely with ($t_2 - t_0$). In the case of the gain scaling for $A_1 = K_A \Delta V_{21}$ being done at element 118, then the gain term $K_T$ for $\Delta V_{20}$ will be made equal to the ratio $$\left( \frac{\Delta t_{21}}{\Delta t_{20}} = \frac{1}{K_A \Delta t_{20}} \right).$$

Figure 5:
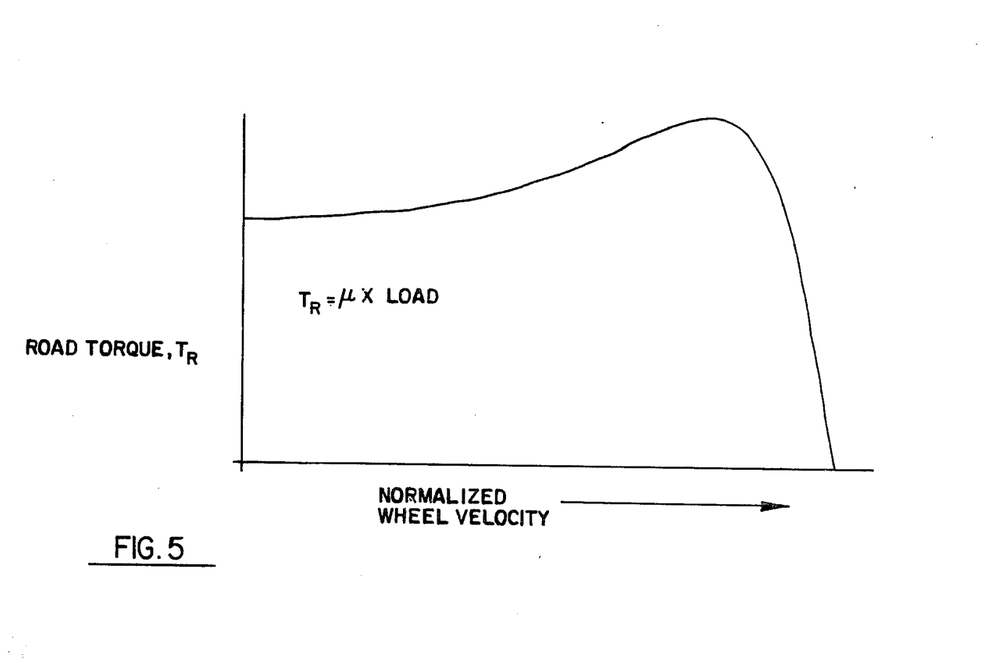
FIG. 5 is an exemplary curve of road torque versus normalized wheel velocity, showing the mirror image relationship thereof to FIG. 4.

Thus, $$A_3 = K_A K_T \Delta V_{20} = K_A \frac{1}{K_A \Delta t_{20}} \Delta V_{20} = \frac{V_2 - V_o}{t_2 - t_o} \quad (4)$$

Where $$K_T = 1/K_A \Delta t_{20}$$

which result corresponds to Equation (2) above. The mechanization of such variable gain term $K_T$ by means of the adjustable element 17B in FIG. 5 is well understood in the art and may be accomplished, for example, by a multiplier or gain control element in a feedback arrangement, the control input thereto being responsive to the value of the interval $\Delta t_{20}$ (provided by a clock and counter) and gain scaled by the amount $K_A$.

Such average acceleration or gain-scaled differential velocity signals are compared by a comparator 18 for providing a signal indicative of the sense of $K_\mu$, the slope of the $\mu$ versus slip curve (FIG. 4). Because the sense of such signal is of more significance than the magnitude thereof, a bipolar signal limiter 20 is preferably provided to limit the response to signals of varying dynamic range or amplitude. Such limiters are well-known in the art and, in analog form, are represented by pairs of oppositely-poled, shunting diodes and preselectively thresholded. See, for example, element 44' in FIG. 5 of U.S. Pat. No. 3,175,786 issued to A. A. Frank, et al, for Helicopter Flight Control System. The limited output of element 118 is applied as a duty cycle (D.C) control input to duty cycle modulator 14 in such sense as to tend to drive the amplitude of the output of comparator 18 to a null, as will be explained more fully in connection with FIGS. 8A and 8B.

Figure 7A:
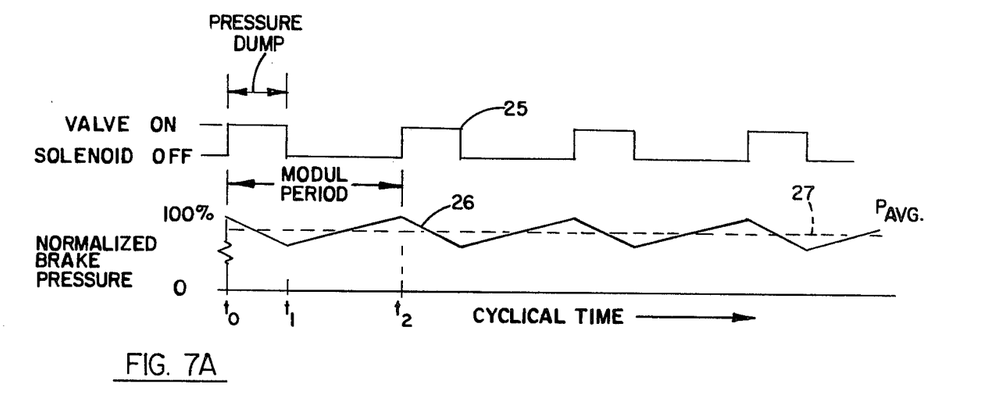
FIGS. 7A and 7B are two sets of representative time histories of the duty cycle output of element 55 of FIG. 6 (and corresponding to the control output of element 14 in FIG. 2), and showing the effect upon the average brake pressure as a function of a duty cycle change in the modulation of the applied brake pressure in a brake control application.
Figure 7B:
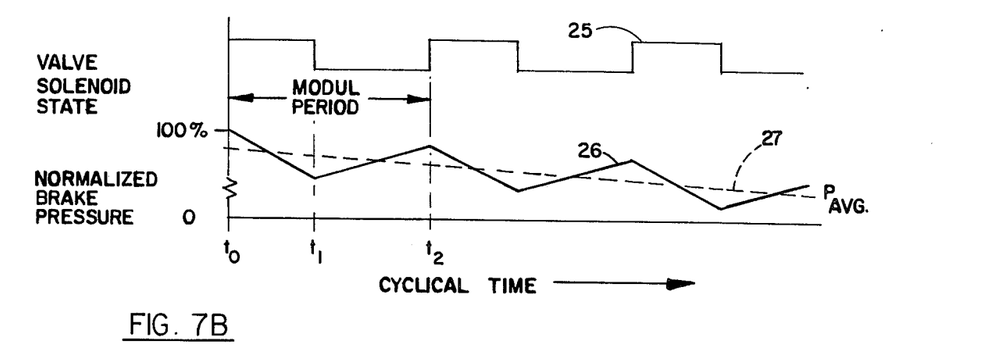

Referring to FIGS. 7A and 7B, there are illustrated two families of time histories of the response of a wheel braking system such as that of FIG. 2 in response to modulator 14 (according to FIGS. 2 or 6). Curve 25 depicts a representative two-state modulation signal output from variable duty-cycle modulation means 14 and applied to an electrohydraulic fluid control valve in brake control system of the type contemplated by the invention and described, for example, in U.S. Pat. No. 3,790,227 to L. C. Dozier for Brake Control. Curve 26 represents the fluid pressure response of the control valve to the binary state changes of the applied input thereof (curve 25), while curve 27 represents a mean, or short period average of pressure response of curve 26. In FIG. 7A, a nominal duty cycle (ratio of pressure-dump time, $t_o$–$t_1$, to total modulation periodicity, $t_o$ to $t_2$) is shown, whereby a flat or unchanging average pressure is achieved (curve 27 in FIG. 7A). In other words, the valve is periodically excited or turned-on (curve 25 at time $t_o$ to $t_1$) by the output of element 14, resulting in a "pressure dumping" or short circuiting of the brake pressure fluid circuit, (curve 26 at $t_o$ to $t_1$). Upon a change in solenoid state to a fixed period of de-energization (curve 25 at $t_1$ to $t_2$), the brake pressure builds up toward the maximum applied pressure until the beginning of the next modulation cycle ($t_2$). As illustrated, the pressure dump rate (slope of curve 26 between $t_o$ to $t_1$) is greater than the pressure restoration rate (slope of curve 26 between $t_1$ to $t_2$) due to the flow characteristics of the valve system. For the representative duty-cycle illustrated in FIG. 7A, the average brake pressure obtained is constant, but at the same time is less than the full applied brake pressure. Were the duty cycle varied such as to decrease the pressure-dump or solenoid-on state interval ($t_o$ to $t_1$) to zero, then the median pressure, $P_{AVG}$ (curve 27), would approach the maximum applied brake pressure. Such variation in the duty cycle would be induced by an acceleration difference between the short period acceleration $A_1$ and the cyclical average acceleration $A_3$, the sense of which difference corresponds to the positive sense of the slope $K_\mu$ of the $\mu$ vs. slip curve in FIG. 4 and calling for an increase in the effective brake pressure, $P_{AVG}$.

Where, however, the sense of the acceleration difference detected by element 18 (in FIG. 6) reverses, corresponding to a negative sense for slope $K_\mu$ of the $\mu$ vs. slip curve (FIG. 4), then element 14 responds by increasing the dump period ($t_o$ – $t_1$), thereby adjusting the duty cycle and incidentally increasing the modulation periodicity ($t_o$–$t_1$), as illustrated in FIG. 7B. Such increase in the dump time (curve 25 at $t_o$–$t_1$ in FIG. 7B) without change in the valve solenoid off-time (curve 25 at $t_1$–$t_2$ in FIG. 7B) results in a negative slope for or progressive decrease in the effective brake pressure, $P_{AVG}$ (curve 27 in FIG. 7B). Such resultant decrease in the effective brake pressure serves to reduce the slip, $s$ (associated with the negative slope of the $\mu$ versus slip curve of FIG. 4), thereby providing the increased $\mu$ associated with such reduced slip as a zero slope for $K_\mu$ or a maximum value for $\mu$ is approached.

If such decrease in the average effective brake pressure $P_{AVG}$ overshoots the point of maxima (or zero slope) and results in a positive slope for $K_\mu$ for such lesser slip (in FIG. 4), then the associated differential acceleration detected by comparator 18 results in a duty cycle change in the output of modulation element 14 (in FIG. 6), reducing the pressure dump interval, increasing the average effective brake pressure, $P_{AVG}$. Such increase in the effective brake pressure increases the slip (in FIG. 4) as to a value more closely associated with the maximum coefficient of friction, $\mu_{max}$ or zero slope ($K_\mu = 0$).

Such "jockeying" of the above-described control system is due in part to the fact that a finite difference signal output or bias from element 18 (in FIG. 6) is normally required to sustain a given or desired operating, or duty cycle, condition of element 14. A preferred way of avoiding the necessity of sustaining such a bias error condition or finite difference output at comparator 18 is to employ a signal integrator 21 in an integral-plus-proportional feed arrangement in FIG. 6, the output of limiter 20 being fed to a signal summer 22 (interposed at the input to duty cycle modulation means 14) and to integrator 21, the output of integrator 21 being fed to signal summer 22. Thus, a bias condition corresponding to that control input to element 14 required to maintain a null output at element 18 is developed at the output of integrator 21, while any transient signal conditions are fed to element 14 in the usual way via signal line 23. A further description and application of integral-plus-proportional control is included in U.S. Pat. No. 3,175,526 to J. M. Johnson, et al, for Automatic Altitude Control System for a Hydrofoil Vessel.

Figure 8A:
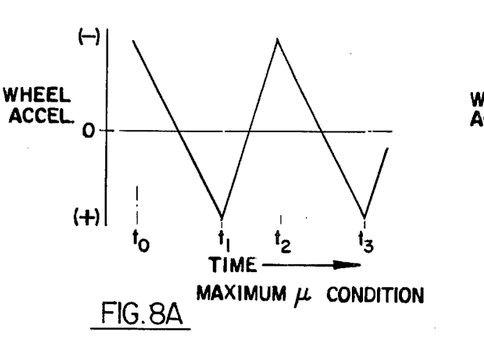
FIGS. 8A, 8B and 8C are exemplary time histories of the resultant wheel acceleration occurring in response to the cyclical ramp brake pressure modulations applied under different conditions of slip.

In order to avoid saturating control authority by the application of too large a bias from integrator 21, a limiter 24 is interposed between the output of integrator 21 and the associated input of summing means 22. No useful purpose is served in permitting the application of a negative bias or steady "pressure increase" signal out of integrator 21. Accordingly, limiter 24 includes a null negative limit, corresponding to simply a series connected, suitably-poled, blocking diode, although a shunting diode may be alternatively employed.

Where the system is operating at the maximum value for $\mu$ (in FIG. 4), corresponding to $K_\mu = 0$, then the associated wheel acceleration response to the brake pressure ramp modulation resembles such modulation, as shown in FIG. 8A. In other words, the perturbed wheel torque or perturbed net wheel acceleration is unaffected by the road torque under the condition $K_\mu = 0$. If, however, the slope $K_\mu$ is not zero (corresponding to other than a maximum condition for $\mu$ in FIG. 4), then the wheel acceleration modulation will be effected by road torque (as well as by the brake torque modulation). In other words, the perturbed wheel torque or perturbed net wheel acceleration will not be proportional to or resemble the brake pressure ramp modulation, as indicated by FIG. 8B (for low slip conditions) or FIG. 8C (for pull-in slip condition).

Figure 8B:
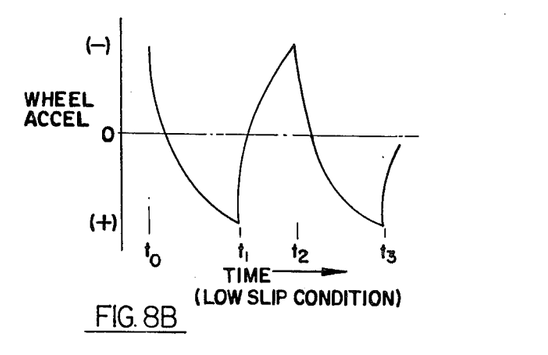
Figure 8C:
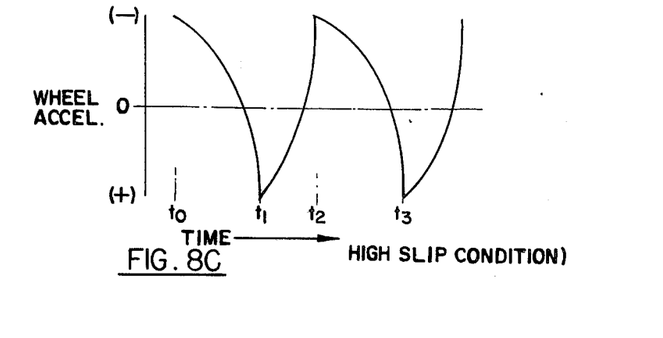

Thus, the existence of the case illustrated by FIG. 8A may be determined by noting the identity of the time-averaged wheel acceleration values $A_1$ and $A_3$, while the sense of the difference between such values for the non-linear cases illustrated in FIGS. 8B and 8C indicates the sense of $K_\mu$, corresponding to the sense of the variation of $\mu$ from a maximum value.

Figure 9:
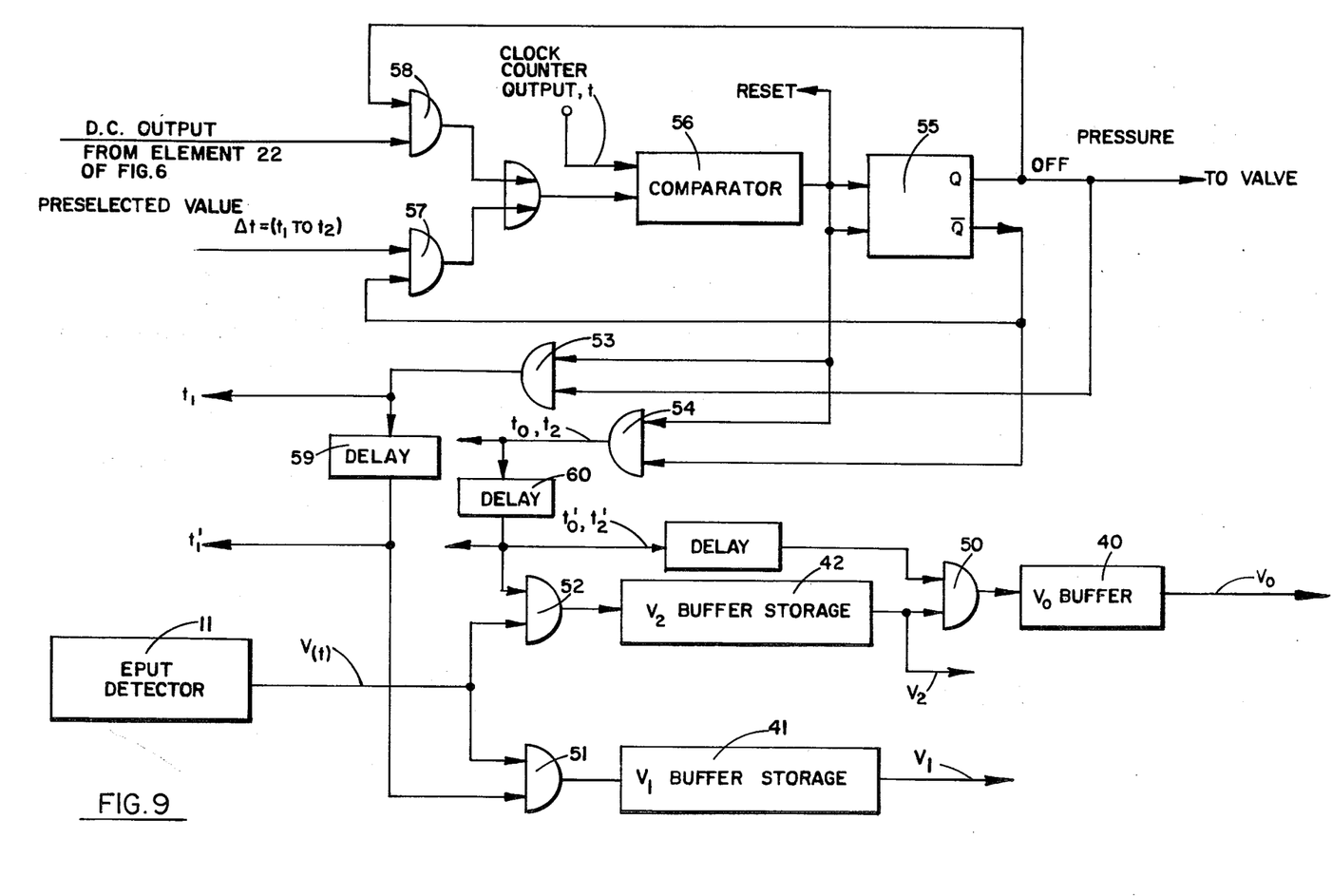
FIG. 9 is a block diagram showing the structural arrangement and cooperation of elements 14 and 11 of FIGS. 2 and 6 in further detail.

Referring now to FIG. 9, there is illustrated in further structural detail the schematic arrangement of means for effecting duty cycle clocking of the velocities employed in FIG. 6 (and determined by means of the EPUT device 11 of FIGS. 1 and 2) under the circumstances of a fixed pressure-restore or off-time, variable pressure on-time (i.e., variable duty-cycle with variable periodicity) for generating the time-averaged velocities $V_0$, $V_1$ and $V_2$. The continuous determination of velocity $V_{(t)}$ from EPUT device 11 by computation is understood in the art, as indicated for example by U.S. Pat. No. 3,805,089. In FIG. 9 there are provided three gated buffer storage elements 40, 41 and 42, each having a gated input 50, 51 and 52, respectively, for storing those values of velocity $V_0$, $V_1$, $V_2$ occurring at those gating times $t_0$, $t_1$ and $t_2$ shown in FIGS. 7A and 7B. There is also provided means for generating gating signals $t_0$, $t_1$ and $t_2$. In such scheme, the value $V_2$, which is gated into storage 42 at the end ($t_2$) of one modulation interval or duty period, is subsequently gated into storage 40 by gate 50 as the value $V_0$ for the subsequent modulation interval or duty cycle period. The gating time $t_1$ for gating signal gate 51 is generated at a logic coincidence or AND gate 53, and the gating time $t_2$ (or $t_0$ of the subsequent modulation interval) is generated at AND gate 54. Such gating signals are generated in response to a state-change, or reset, signal applied to a flip-flop or bistable multivibrator 55 and to mutually exclusive states of flip-flop 55, the Q state output of flip-flop 55 being applied to logic state 53 as well as to a brake control solenoid; and the $\overline{Q}$ state of flip-flop 55 being applied to logic gate 54. Because of the transport delay lags in the brake valve being controlled, a corresponding delay (by means of delay elements 56 and 57) may be interposed between the outputs of gates 53 and 54 and the inputs of gates 51 and 52.

The duration of each of states Q and $\overline{Q}$ of flip-flop 55 corresponds to a preselected part of the two-part control duty cycle period $t_0$ to $t_2$, state Q corresponding to the (variable) dump or "ON" interval ($t_0$ to $t_1$) and the state $\overline{Q}$ corresponding to the (fixed) pressure restore or "OFF" interval ($t_1$ to $t_2$).

Each of such two intervals is generated alternately by comparing a number corresponding to such interval with the counting of a resettable clock: upon the clock count equalling the reference number of interest, as noted at comparator 56, a reset signal resets the clock and changes the state of flip-flop 55, signalling the occurrence of a timing or gating instant of interest at gate 53 or 54. The changed output state of flip-flop 55 is employed to gate-off the previous reference number and gate-on the alternate reference number.

For example, as depicted in the arrangement of FIG. 9, a $\overline{Q}$ state of flip-flop 55 is employed by a signal gate 57 to gate-on a signal value corresponding to the (fixed) pressure restore or OFF mode of the valve control. Such value is compared with the count-out, $t$, of a resettable clock (not shown) at comparator 56. Upon the count-up of the clock equalling the fixed value preselected for the interval, $t_1$ to $t_2$, then a trigger output from comparator 56 resets the clock and changes the state of flip-flop 55 to the Q state, thereby turning-off signal gate 57 and turning on signal gate 58. Such coincidence of the Q state (output of flip-flop 55) and the reset trigger (from comparator 56) provides a $t_0$ trigger or timing output at gate 54. Also, such Q state gates-on signal gate 58, whereby a selected interval corresponding to the (variable) pressure dump interval of ON mode of the valve control is generated. Such interval is generated as a function of or may be merely proportional to the output of signal combining means 22 in FIG. 6. Upon the count-up of the clock equalling the value selected for the interval $t_0$ to $t_1$, then a trigger output from comparator 56 resets the clock and changes the state of flip-flop 55 from the Q state to the $\overline{Q}$ state, such trigger and $\overline{Q}$ state corresponding to output $t_1$ at gate 53.

Thus, it is seen that upon the resetting of the clock, flip-flop 55 is placed in an alternate one of states Q and $\overline{Q}$, corresponding to an alternate portion of the control duty cycle illustrated in FIGS. 7A and 7B. In other words, the illustrated cooperation of elements 53, 54, 55 and 56 in FIG. 9 corresponds to element 14 in FIGS. 2 and 6 to provide a variable duty cycle of variable periodicity and having a fixed "OFF" time or pressure restore mode.

Figure 10:
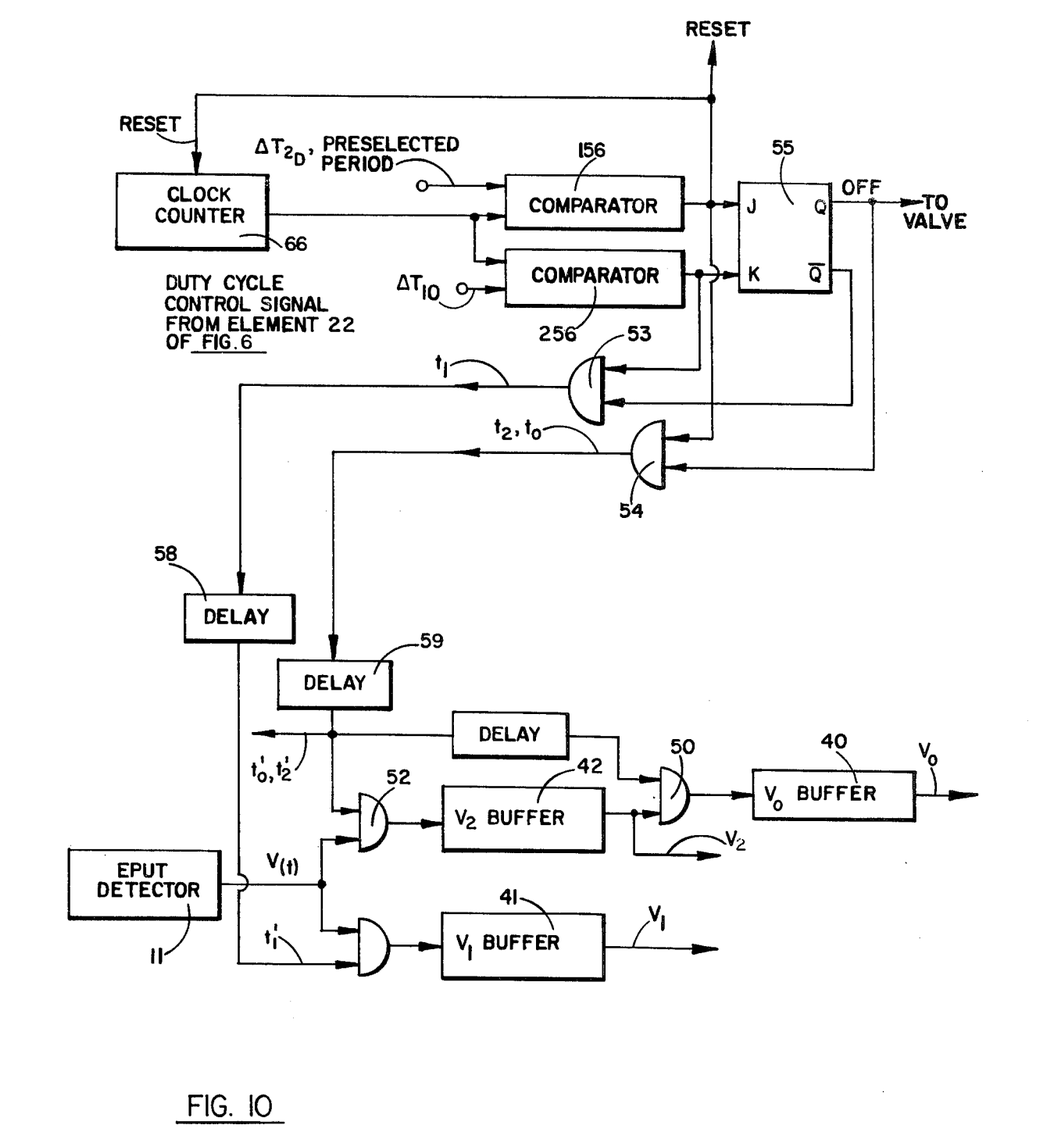
FIG. 10 is a block diagram of an alternative arrangement of the structural combination of FIG. 9.

Although the concept of the invention as disclosed in FIG. 9 has been described in terms of a variable period duty cycle having a variable pressure dump interval and fixed pressure restore interval, it is clear that a fixed periodicity duty cycle could be employed, whereby variation of the pressure dump interval serves to oppositely vary the pressure restore interval, as shown in FIG. 10.

Referring to FIG. 10, there are shown timing gates 53 and 54 in like cooperation with storage elements 40, 41 and 42 as the like referenced elements of FIG. 9. There is further provided a comparator 156 responsive to both a resettable clock 66 and a preselected value $\Delta t_{20}$ corresponding to a fixed modulation periodicity, for generating a trigger or reset signal corresponding to the end, $t_2$, of a duty cycle period or $t_0$, the beginning of the following duty cycle. Such trigger is applied as an input to flip-flop 55 and also to a reset input of clock 66 for resetting thereof at the end of each preselected interval $\Delta T_{20}$, corresponding to the period $t_0$ to $t_2$; and is further applied as a gate control input corresponding to time $t_2$ for control of signal gate 53.

Also included in the arrangement of FIG. 10 is a second comparator 256 responsive to clock 66 and to the variable output signal from element 22 of FIG. 6 and corresponding to the variable duty cycle ON time interval, $t_0$ to $t_1$. When the reset clock 66 (in the course of counting up to $t_2$) counts to $t_1$, then comparator 256 generates a trigger output which is fed to a second input of flip-flop 55 for switching the state thereof. Such trigger output, corresponding to time $t_1$, is also applied as a gate control input for control of signal gate 51.

Thus, it is appreciated that the cooperation of the illustrated arrangement of FIG. 10 provides a sampled initial velocity $V_0$ at the beginning of a fixed modulation interval, a sampled terminal velocity $V_2$ at the end of such interval, and a sampled intermediate velocity, the occurrence of which changes with the duty cycle.

Although the control criterion for control of the duty cycle has been described in terms of comparing the time averaged acceleration $A_3 = \Delta V_{20}/\Delta t_{20}$ and $A_1 = \Delta V_{10}/\Delta t_{10}$ for a variable pressure dump interval $\Delta t_{10}$ for both a fixed and a variable modulation interval $(\Delta t_{20})$, it is clear that the concept of the invention is not so limited. It is clear that for the variable modulation interval, a fixed pressure dump interval $(\Delta t_{10})$ could be employed rather than a fixed pressure restore interval $(\Delta t_{21})$. Also, instead of employing the set of accelerations $A_3$ and $A_1$, other sets could be employed such as $A_3$ and $A_2 = \Delta V_{21}/\Delta t_{21}$ or $A_1$ and $A_2$.

Figure 3:
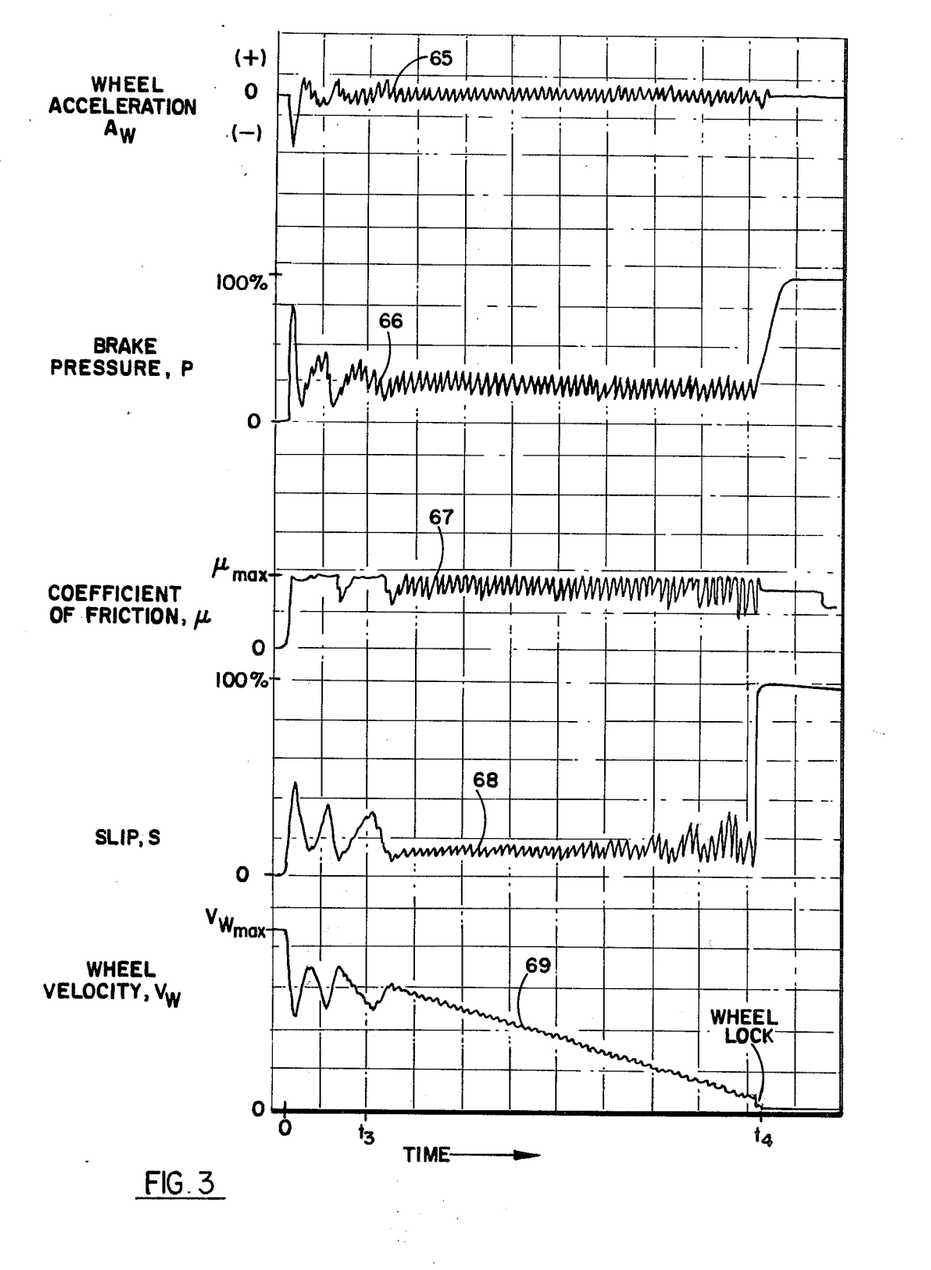
FIG. 3 is a family of time histories, illustrating the representative responses of various parameters of a system embodying the concept of the invention.

A system, including several detail structural alternatives, for practicing the invention having been described, the normal operation thereof may now be more fully appreciated from a consideration of FIG. 3.

Referring to FIG. 3, there is illustrated a family of time histories, illustrating the response of a vehicle control system in which the concept of the invention is embodied in a wheel braking application. Assuming the vehicle operator's full application of braking pressure (corresponding to a normalized value of 100% for curve 66) at time 0, the wheel slip (curve 68) begins to increase, with a resultant decrease in wheel velocity (curve 69) and increase in the coefficient of friction (curve 67). As the duty cycle of the control system operates to dither the brake pressure (short period perturbations of curve 66), the average brake pressure slowly jockeys up and down (curve 66 between $t = 0$ and $t_3$), causing the wheel slip (curve 68) to correspondingly jockey in maintaining an optimum coefficient of friction condition (curve 67 between $t = 0$ and $t_3$). As a proper control bias is built up on integrator 21 in FIG. 6, the short period average brake pressure between $t_3$ and $t_4$ becomes relatively unchanging, as does the average slip (curve 68), and the brake pressure dithering of the inventive concept occurs about an operating point which results in maximizing the coefficient of friction (curve 67), while the wheel velocity (curve 69) generally proceeds smoothly to a stop without locking up or skidding at high velocities.

Accordingly, there has been disclosed an improved anti-skid control means employing a ramp-torque dithering control duty cycle in conjunction with proportional-plus-integral control of the duty cycle as a function of variations of the wheel-road coefficient of friction from an optimum value.

Although the invention has been described in terms of its application to control of a wheel brake system, the concept of the invention is not so limited and may also be applied to torque modulation (such as ignition control) in the prime mover control of an accelerating vehicle.

Although the invention has been described and illustrated in detail, it is to be clearly understood that the same is by way of illustration and example only and is not to be taken by way of limitation, the spirit and scope of this invention being limited only by the terms of the appended claims.

We claim:
1. In an anti-skid type control system for wheeled vehicles having both braked wheels and a prime mover for applying an accelerating torque to said wheels, apparatus for maintaining wheel slip (s) in a region of values associated with a maximum coefficient of road friction $\mu$, comprising
   first means for determining the variation of the coefficient of friction from a maximum value and including pulse modulation means for periodically increasing and decreasing alternately an alternative one of a braking action and accelerating torque; and
   second means responsive to said first means for changing said alternative one of an applied braking action and an applied accelerating torque in such sense as to increase said coefficient of friction and including integral-plus-proportional control means for both applying the pulse modulation of said pulse modulation means and biasing the average system acceleration condition about which such modulation is applied, said modulation being varied in a sense to maximize said coefficient of friction.

2. In an anti-skid type control system for wheeled vehicles having both braked wheels and a prime mover for applying an accelerating torque to said wheels, apparatus for maintaining wheel slip ($s$) in a region of values associated with a maximum coefficient of road friction $\mu$, comprising first means for determining the variation of the coefficient of friction from a maximum value and including pulse modulation means for periodically increasing and decreasing alternately an alternative one of a braking action and accelerating torque; and second means responsive to said first means for changing said alternative one of an applied braking action and an applied accelerating torque in such sense as to increase said coefficient of friction and including integral-plus-proportional control means for both applying the pulse modulation of said pulse modulation means and biasing the average system acceleration condition about which such modulation is applied, said modulation being varied in a sense to maximize said coefficient of friction;

said first means for determining further comprising third means for determining the time-averaged wheel acceleration averaged over an interval between two successive points of inflection of such acceleration as a function of time and representing an interval of a time rate of change of acceleration having a preselected sense;

fourth means for determining the time-averaged wheel acceleration over a control cycle or interval between three successive points of inflection of such acceleration and representing two successive intervals of a time rate of change of acceleration having mutually opposed senses; and comparator means responsive to said third and fourth means for providing an output indicative of the difference between a respective output of said third and fourth means.

3. In an anti-skid type control system for wheeled vehicles having both braked wheels and a prime mover for applying an accelerating torque to said wheels, apparatus for maintaining wheel slip (s) in a region of values associated with a maximum coefficient of road friction $\mu$, comprising first means for determining the variation of the coefficient of friction from a maximum value; and second means responsive to said first means for changing an alternative one of an applied braking action and an applied accelerating torque in such sense as to increase said coefficient of friction;

said first means for determining further comprising pulse modulation means for periodically increasing and decreasing said alternative one of said braking action and accelerating torque over a control cycle;

third means for determining the time-averaged wheel acceleration averaged over an interval between two successive points of inflection of such acceleration as a function of time and representing a pulse width modulation interval of said pulse width modulation means;

fourth means for determining the time-averaged wheel acceleration over said control cycle or interval between three successive points of inflection of such acceleration and representing the periodicity of said pulse width modulation means; and comparator means responsive to said third and fourth means for providing an output indicative of the difference between a respective output of said third and fourth means, a modulation control input of said pulse modulation means being responsively coupled to said output of said comparator.

4. The device of claim 3 in which said second means includes integral-plus-proportional control means responsively coupled to said comparator for driving said pulse modulation means.

5. The device of claim 4 in which said integral-plus-proportional control means includes:

signal combining means for providing an output indicative of the combined inputs thereto, and having a first and second input, said first input being responsively coupled to said comparator;

signal integrating means responsively coupled to said comparator for providing an output indicative of the time integral of the output of said comparator; and signal limiting means intercoupling an output of said signal integrating means and said second input of said signal combining means for amplitude limiting the output of said integrator.

6. The device of claim 3 in which there is further provided forward-loop signal processing means responsive to said comparator for biasing the output thereof in a sense to assure positive braking action in the presence of a null output from said comparator.

7. The device of claim 6 in which said forward loop processing means includes signalling limiting means for limiting the magnitude of said biased difference output to within a preselected maximum value.

8. The device of claim 6 in which said forward loop processing means further includes:

signal combining means having a first and second input, said first input being responsively coupled to an output of said signal limiting means;

limited signal integrating means responsively coupled to said output of said signal limited means for providing an amplitude limited output indicative of the time-integral of said output of said signal limiting means, said second input of said signal combining means being responsively coupled to said output of said limited signal integrating means, said signal combining means providing an output signal for control of said pulse modulation means.

9. In an anti-skid type control system for wheeled vehicles having both braked wheels and a prime mover for applying an accelerating torque to said wheels, apparatus for maintaining wheel slip ($s$) in a region of values associated with a maximum coefficient of road friction $\mu$, comprising first means for determining the variation of the coefficient of friction from a maximum value; and second means responsive to said first means for changing an alternative one of an applied braking action and an applied accelerating torque in such sense as to increase said coefficient of friction;

said first means for determining further comprising pulse modulation means for periodically increasing and decreasing said alternative one of said braking action and accelerating torque over a preselected control cycle corresponding to the periodicity of said pulse modulation means;

gated fourth means gated by said pulse modulation means for determining the time-averaged wheel acceleration averaged over an interval between two successive points of inflection of such acceleration as a function of time and representing an alternative one of said pulse modulation periods of increasing and decreasing; and gated fifth means gated by said pulse modulation means for determining the time-averaged wheel acceleration averaged alternatively over the remaining one of said periods of increasing and decreasing and said control cycle representing the periodicity of said pulse width modulation means;

comparator means responsive to said third and fourth means for providing an output indicative of the difference between a respective output of said third and fourth means, a modulation control input of said pulse modulation means being responsively coupled to said output of said comparator.

10. In an anti-skid type braking control system for avoiding wheel lock-up in braked wheeled vehicles, apparatus for maintaining wheel slip ($s$) in a region of values associated with a maximum coefficient of road friction $\mu$, comprising first means for determining the sense of the slope $d\mu/ds$ of the coefficient of friction as a function of slip; and second means responsive to said first means for changing an applied braking action in the same sense as the sense of said rate of change function $d\mu/ds;$ said first means for determining further comprising third means for determining the time-averaged wheel acceleration averaged over an interval between successive points of inflection of such acceleration and representing an interval of a time rate of change of acceleration having a preselected sense;

fourth means for determining the time-averaged wheel acceleration over a control cycle or interval between three successive points of inflection of such acceleration and representing two successive intervals of a time rate of change of acceleration having mutually opposed senses; and comparator means responsive to said third and fourth means for providing an output indicative of the difference between the respective outputs of said third and fourth means.

11. The device of claim 10 in which there is further provided forward-loop signal processing means responsive to said comparator for biasing the output thereof in a sense to assure positive braking action in the presence of a null output from said comparator.

12. The device of claim 11 in which said forward loop processing means includes signalling limiting means for limiting the magnitude of said biased difference output to within a preselected maximum value.

13. The device of claim 11 in which said forward loop processing means includes integral-plus-proportional control means for establishing a system operating point at a preselected point of inflection of said coefficient of friction as a function of slip.

14. The device of claim 11 in which said forward loop processing means further includes:

signal combining means having a first and second input, said first input being responsively coupled to an output of said signal means;

limited signal integrating means responsively coupled to said output of said signal limited means for providing an amplitude limited output indicative of the time-integral of said second input of said signal combining means being responsively coupled to said output of said limited signal integrating means, said signal combining means providing an output signal for modulation and control of said braking control system.

* * * * *